United States Patent Office 3,536,783
Patented Oct. 27, 1970

3,536,783
PROCESS FOR THE PREPARATION OF MODIFIED RESINS
Kerry David Jeffreys, and Howard Williams, Cardiff, Wales, assignors to BP Chemicals (U.K.) Limited, London, England, a British company
No Drawing. Filed Sept. 28, 1967, Ser. No. 671,206
Claims priority, application Great Britain, Oct. 5, 1966, 44,518/66
Int. Cl. C08g *37/16, 37/18*
U.S. Cl. 260—845
9 Claims

ABSTRACT OF THE DISCLOSURE

A process for the preparation of a rubber-modified novolak resin which comprises allowing an aldehyde and a molar excess of a phenol to react under novolak reaction conditions in the presence of a latex of a nitrile rubber comprising as essential components polymerised acrylonitrile and butadiene units.

---

This invention relates to a process for the preparation of modified resins, more particularly to the preparation of rubber modified novolak resins.

Rubber modified resole resins have been prepared by adding rubber latices to resole reaction mixtures, resole resins being prepared by the reaction of an aldehyde with a phenol under alkaline conditions.

Since novolak resins are usually prepared by reacting an aldehyde and a phenol under acid conditions and since rubber latices are known to be unstable under acid conditions, rubber modified novolak resins have not been prepared by the method used for resole resins. They have hitherto been prepared by the laborious and time-consuming steps of rolling, compounding or milling together solid rubber with the novolak resin. Under these conditions it is difficult to obtain a resin having the rubber uniformly dispersed therein.

Rubber modified novolak resins have also been prepared by dissolving both the resin and the rubber in a mutual solvent and evaporating the solvent in a subsequent step. This method suffers from the disadvantage of being time-consuming and relatively expensive. It is time-consuming because the rubber tends to dissolve slowly in the solvent and it is expensive by virtue of the solvent used and lost throughout the process.

We have now surprisingly found that by using certain rubber latices and a novolak reaction mixture satisfactory rubber-modified resins are obtained by a process which is considerably faster and more economic than those referred to above.

Accordingly, the present invention is a process for the preparation of a rubber-modified novolak resin which comprises allowing an aldehyde and a molar excess of a phenol to react under novolak reaction conditions in the presence of a latex of a nitrile rubber comprising as essential components polymerised acrylonitrile and butadiene units.

The nitrile rubber latex is preferably a butadiene/acrylonitrile copolymer latex but it may be a ter- or higher polymer latex formed by adding one or more additional monomers to the butadiene/acrylonitrile reaction mixture. Examples are styrene and methyl methacrylate. A modified nitrile rubber latex may also be used, for example a latex comprising nitrile rubber containing carboxylic groupings.

There is a wide range of commercially available butadiene/acrylonitrile rubber latices and these usually contain from about 10 to 55% by weight of acrylonitrile units. A convenient range of such nitrile rubbers are available from British Geon Ltd. and are marketed under the registered trademark "Breon."

The phenol may be one or a mixture of the phenols commonly used in the production of novolak resins, for example a phenol, a cresol, a xylenol or a naphthol. Phenol ($C_6H_5OH$) is the preferred phenol.

The aldehyde may be one or a mixture of the aldehydes known to give satisfactory novolak resins, e.g. formaldehyde, acetaldehyde and benzaldehyde. Formaldehyde is preferred and it is conveniently used in the form of paraform or an aqueous formaldehyde solution, e.g. formalin.

The reaction conditions employed are those known for the production of novolak resins, that is to say the phenol should be present in molar excess based on the aldehyde present, for example 0.1 to 50% molar excess, the pH should be less than 7, for example 6.9 to 1, and the temperature should preferably lie in the range 50° to 200° C.

For example, a typical novolak is prepared by refluxing phenol with formalin in a molar ratio of 1 mole of phenol for every 0.9 mole of available formaldehyde and in the presence of about 1–5% by weight of an acid catalyst, e.g. aqueous oxalic acid, the reflux temperature being about 95°–100° C. Examples of alternative acids which may be conveniently used are sulphuric, hydrochloric, phosphoric, nitric, formic and acetic acid.

In the process of the present invention the nitrile rubber latex may be added before or during reaction of the aldehyde with the phenol. It is preferable, however, to add the rubber latex during the phenol/aldehyde reaction and it may be added towards the end of the reaction, e.g. when there is about 2% by weight of unreacted formaldehyde present in the reaction mixture. When the reaction is complete the liquid phase of the latex can then be removed by any convenient means, e.g. by distillation under reduced pressure.

The rubber modified novolak resins produced by the process of the present invention preferably contain 1.0 to 30% by weight of nitrile rubber. This corresponds to adding to the novolak reaction mixture about 5 to 150 parts dry weight of nitrile rubber as latex for every 100 parts of formaldehyde used in the process of the present invention.

The process of the present invention yields, after removal of volatile matter, solid novolak resins in which the rubber dispersion is particularly uniform, the resin being substantially transparent and substantially free from rubber agglomerations.

The advantages of the present process over the prior art processes are:

(i) Saving of time.—The process of the invention yields a rubber modified novolak resin in substantially the same time as it takes to prepare an unmodified novolak resin. For example, in the production of 1 ton of rubber-modified resin by the method of milling together rubber with resin, 7 hours or more extra processing time are required as compared with the production of a similar quantity by the process of the invention.

(ii) Uniform dispersion of the rubber in the resin.—The uniformity of dispersion is readily apparent from the transparent or substantially transparent nature of the modified resin.

(iii) Resins have good "hot flow" properties.—The ability to flow when heated under moulding conditions is much better for the resins of the present invention compared with those rubber-modified resins obtained from a milling/compounding technique.

(iv) Convenience.—The process is simple and requires no specialised equipment. Moreover, since many nitrile rubbers are usually prepared in latex form the rubbers need no further processing for use in the present invention.

The rubber modified resins produced by the process of the present invention may be mixed with the usual curing agents for novolak resins, for example hexamethylene tetramine or paraform to give, on heating, thermosetting resins. Curing agents for the rubber, e.g. zinc oxide, sulphur and accelerators may also be added to the rubber modified resin if desired.

Conventional inorganic or organic fillers may be added to the rubber modified resins to produce moulding compositions.

The rubber modified resins are more plasticised, more flexible and/or shock resistant than unmodified novolak resins and thus are useful for example as binder resins in the manufacture of friction elements such as brake linings and clutch facings.

The invention is further illustrated by the examples that follow:

EXAMPLE 1

The following were charged to a flask fitted with a reflux condenser, thermometer and stirrer.

Phenol—1880 g. (20 moles)
Formalin 37%—1460 g. (18 moles of HCHO)
Oxalic acid—5.0 g. (dissolved in 25 g. of water)

The mixture was heated to reflux and was maintained at reflux until the free formaldehyde content (as determined by hydroxylamine hydrochloride) was less than 3% (2½ hours). 263 g. of Breon 1561 (a butadiene/acrylonitrile latex containing 39–42% by weight of bound acrylonitrile and having a solids content of 39–42% manufactured by British Geon Ltd.) was added over 5 minutes and the mixture was then distilled under a reduced pressure of 25 mm. mercury to a final resin temperature of 165° C. The resin when cold was an almost clear, off-white solid of softening point (ring and ball) 102° C. The ground resin could be cured to an insoluble, infusible form by heating at 150° C. with 10% addition of hexamine.

EXAMPLE 2

Phenol—940.0 g. (10 moles)
Formalin 37%—709.5 g. (8.75 moles HCHO)
Oxalic acid—5.0 g. (dissolved in 25 g. of water)

The above ingredients were charged to a flask and heated to reflux with stirring. When the free formaldehyde content of the mix was 1.3% (about 2½ hours) 135 g. of Breon 1512E2 latex (a butadiene/acrylonitrile latex containing 32–34% by weight of bound acrylonitrile and a solid content of 30–32% manufactured by British Geon Ltd.) was stirred in over 15 minutes. Vacuum (24 mms. mercury pressure) was applied and the batch distilled to a final resin temperature of 165° C. The resin was poured and hardened on cooling to an off-white almost clear solid of softening point (ring and ball) of 98° C.

EXAMPLE 3

Phenol—1880 g. (20 moles)
Formalin 37%—1460 g. (18 moles of HCHO)
Oxalic acid—10 g. (in 40 g. of water)

The above ingredients were charged to a flask and stirred with warming. As soon as the solution became clear 263 g. of Breon 1561 latex were run in over 5 minutes. The mixture was heated to reflux and maintained at reflux for 150 minutes, after which time the resin was dehydrated under vacuum (24 mms. of mercury pressure) to a final temperature of 150° C. The resin on cooling hardened to an almost transparent solid novolak of ring and ball softening point 97° C. The ground resin was then mixed with 9% by weight of hexamine and the mixture cured rapidly at 150° C. to give an insoluble thermoset product.

EXAMPLE 4

Phenol—1880 g. (20 moles)
Formalin 37%—1460 g. (18 moles of HCHO)
Oxalic acid—10 g. (in 40 g. of water)

The ingredients were heated to reflux, with stirring and were maintained at reflux for 2½ hours. 263 g. of Breon 1577 (a carboxylic modified butadiene/acrylonitrile latex containing 27–29% by weight of bound acrylonitrile and having a solids content of 38–41% by weight manufactured by British Geon Ltd.) were added over 5 minutes. The resin was dehydrated as in the previous example. An off-white almost transparent solid novolak of softening point 103° C. (ring and ball) was obtained. The ground resin was then mixed with 9% by weight of hexamine and the mixture cured rapidly at 150° C. to give an insoluble, thermoset product.

EXAMPLE 5

Comparative test on "Hot Flow Properties"

Tests were carried out on the hot flow properties of two resins prepared according to the invention, on two resins prepared by the known compounding milling technique and on a resin containing no rubber.

In the test a half-inch diameter pellet is prepared from a mixture of the resin and hexamine curing agent (ratio 10:1 by weight) and is placed on a horizontal glass plate in an oven maintained at 135° C. After 2 minutes the plate is inclined to an angle of 65° to the horizontal and is left in the oven for a further 20 minutes. The plate is then removed from the oven and the length of the pellet is measured to the nearest millimetre. The increase in length of the pellet is a measure of the hot flow properties of the resin.

Two samples of a resin (Resin A) prepared according to Example 3 were tested one having 5% by weight rubber the other having 10% by weight rubber. Two samples of a similar novolak resin (Resin B) having 4.5% and 12% by weight of nitrile rubber respectively compounded and milled therewith were also tested. A sample of a similar novolak resin without the rubber was also tested.

The results are given in the table below from which it is readily apparent that the two samples of Resin A prepared according to the process of the present invention have markedly superior hot flow properties to those of the two samples of Resin B prepared according to the conventional compounding/milling technique. The ability of the resin to hot flow is a great advantage in moulding processes, particularly in the preparation of pads for disc brakes, since uniform coherent mouldings are obtained.

TABLE

| Resin: | Increase in pellet length after test (mm.) |
| --- | --- |
| Resin A (5% rubber) | 44 |
| Resin A (10% rubber) | 25 |
| Resin B (4.5% rubber) | 0 |
| Resin B (12% rubber) | 0 |
| Resin C (no rubber) | 50–60 |

We claim:
1. A process for the preparation of a rubber-modified novolak resin having up to 30% rubber which comprises reacting an aldehyde and a molar excess of a phenol based on the aldehyde present under novolak reaction conditions which comprises a pH less than 7.0, a reaction temperature from 50°–200° C. until the free aldehyde content of reaction material is less than 3% in the presence of a latex of a nitrile rubber comprising an essential components polymerized acrylonitrile and butadiene units.

2. A process for the preparation of a rubber-modified novolak resin as claimed in claim 1 wherein the nitrile rubber latex is a butadiene/acrylonitrile copolymer latex containing 10–55% by weight of acrylonitrile units.

3. A process for the preparation of a rubber-modified novolak resin as claimed in claim 1 wherein the phenol is phenol ($C_6H_5OH$).

4. A process for the preparation of a rubber-modified novolak resin as claimed in claim 1 wherein the aldehyde is formaldehyde.

5. A process for the preparation of a rubber-modified novolak resin as claimed in claim 1 wherein the nitrile rubber latex is added during and towards the end of the reaction of the aldehyde with the phenol.

6. A process for the preparation of a rubber-modified novolak resin as claimed in claim 1 wherein the aldehyde is formaldehyde and 5–150 parts dry weight of nitrile rubber are used for every 100 parts by weight of formaldehyde.

7. A process for the production of a rubber-modified novolak resin as claimed in claim 1 wherein the resulting resin is mixed with a curing agent capable of converting the resin into a thermoset product.

8. A rubber modified novolak resin having up to 30% rubber obtained by reacting an aldehyde and a molar excess of a phenol based on the aldehyde present under novolak reaction conditions which comprises a pH less than 7.0, a reaction temperature from 50°–200° C. until the free aldehyde content of reaction material is less than 3% in the presence of a latex of a nitrile rubber comprising as essential components polymerized acrylonitrile and butadiene units.

9. A rubber modified novolak resin according to claim 8 containing 1 to 30% of nitrile rubber.

References Cited

UNITED STATES PATENTS

| 2,652,353 | 9/1953 | Wilson | 260—29.3 |
| 2,848,355 | 8/1958 | Bartell | 260—845 |
| 3,437,122 | 4/1969 | Van Gils | 260—29.3 |

FOREIGN PATENTS

| 530,505 | 9/1956 | Canada. |
| 736,549 | 6/1966 | Canada. |

JOHN C. BLEUTGE, Primary Examiner

U.S. Cl. X.R.

260—29.3, 846